May 1, 1962 J. MARTIN 3,032,299
MULTISERVICE CONNECTOR DEVICES FOR THE OCCUPANTS OF AIRCRAFT
Filed March 11, 1958 5 Sheets-Sheet 4

FIG.8

3,032,299
Patented May 1, 1962

1

3,032,299
MULTISERVICE CONNECTOR DEVICES FOR THE OCCUPANTS OF AIRCRAFT
James Martin, Southlands Manor, Southlands Road, Denham, near Uxbridge, England
Filed Mar. 11, 1958, Ser. No. 720,759
Claims priority, application Great Britain Mar. 11, 1957
18 Claims. (Cl. 244—122)

This invention relates to multi-service connector devices for the occupants of aircraft, especially fast flying high altitude aircraft (such as those used for military purposes, for example) and especially those furnished with ejection seats.

Nowadays the operational altitudes of military aircraft are becoming so great that it is considered necessary not merely to place the cockpit of the aircraft under pressure but also to provide means whereby the clothing e.g. an inflatable jerkin or suit, of a pilot or crew member and/or other occupants of the aircraft, all hereinafter called "airmen," may be pressurised if desired. It is also considered necessary to provide garments (hereinafter referred to as "anti-G garments") which can be individually put under fluid pressure to counteract the effects of gravitation and in order to make the wearing of these items of clothing tolerable, air ventilated undergarments are also required. Supplies of oxygen are also required by the airmen. All such equipment involves the use of several separate hoses which have to be connected to corresponding supply sources in the aircraft. Also required are electrical connections for various purposes, for example, radio intercommunication.

An object of this invention is to provide means whereby a plurality of, and preferably all, such services as mentioned above may be passed to an airman through a common connector which enables the airman to connect or disconnect himself with or from the supplies in the aircraft by a simple operation, thus avoiding the tedious and time consuming necessity for each hose and cable to be individually connected as has hitherto been standard practice.

According to one aspect of the invention there is provided, for an aircraft having a source for the supply of fluid (such as air, pressurised air or oxygen) to an airman, a connector for coupling such source to a supply line carried by the airman, such connector comprising: a personal part which is the terminal piece for the airman's supply line; a body part for attachment to a part of the aircraft so as to be independent of the airman, said body part being formed with a passage for conveying said fluid therethrough and for passing such fluid to said personal part and thereby to the airman's supply line; means for coupling said body part to said supply source; detent means for fluid-tightly connecting together the said personal and body parts of the connector so as to place the airman's supply line in communication with said supply source; and a valve on at least one of the said parts of the connector or in said coupling means and adapted to prevent the flow of fluid through such part or means upon disconnection of such part or means from the remainder of the connector.

According to a further aspect of the invention there is provided, for an aircraft having at least two sources for the supply of fluid (such as air, pressurised air and oxygen) to an airman, a connector for coupling such sources to supply lines carried by the airman, such connector comprising: a personal part which is the terminal piece for the airman's supply lines; a body part for attachment to a part of the aircraft so as to be independent of the airman, said body part being formed with at least two passages for conveying said fluid therethrough and for passing such fluid to said personal part and

2 thereby to the airman's supply lines; means for coupling said body part to said supply sources; detent means for fluid-tightly connecting together the said personal and body parts of the connector so as to place the airman's supply lines in communication with said supply sources; and a valve in at least one of the passages in said body part adapted to close such passage upon disconnection of the body part from said supply sources.

Desirably the said connector includes, besides the said separable personal part and the said body, a further major part (hereinafter called "the aircraft part") complementary to, and adapted for attachment to, the said body and serving to connect the said passages and conductor means (where provided) of such body to the said aircraft supply sources, said aircraft part of the connector conveniently being of a similar form to the said personal connector part, and the said body and aircraft parts of the connector having co-operating detent means enabling these parts to be quickly connected and disconnected.

Particularly in high flying fast aircraft, it is now-a-days customary to provide at least one airman (the pilot) with an ejection seat with which he can be launched from the aircraft in an emergency. With such an ejection seat, provision is made for releasing the airman from the seat by disconnecting the seat harness (which may be combined with the airman's parachute harness) from the seat shortly after the launching of the latter from the aircraft. Moreover, in such ejection seats, means are desirably provided for restraining the airman's legs against movement under the high forces to which they are subjected when the seat is launched into a high speed air stream, the preferable arrangement being such that the said leg-restraining means only come into operation when the seat is ejected from the aircraft and are released when the airman is freed from the seat.

Ejection seats of the above form are produced by the Martin-Baker Aircraft Co. Limited and are described, inter alia, in Patents Nos. 583,257, 640,520, 652,131, 673,147, 685,125, 711.234, 721,752, 761,506, 761,507. 770,914, and others, whilst various forms of the leg-restraining means above referred to are described in Patent No. 724,955.

It is, therefore, a further object of the invention to provide a multi-service connector which is particularly suitable for use with an ejection seat and also to make provisions whereby an airman using such a seat is able readily to release himself (e.g. by one simple movement) from the multi-service connector and from the leg restraining means (where provided) of the seat, and whereby he will, in an emergency involving ejection of the seat from the aircraft, be automatically released from the multi-service connector and leg restraining means subsequent to the ejection of the seat from the aircraft and substantially at the same time as he is freed from such seat by release of the seat harness therefrom. A further object of the invention is to make provisions whereby the airman is able, by manual action, completely to release himself from the multi-service connector, the leg restraining means and the seat in an emergency and in the event of him not being automatically released, for example due to some fault, from these parts.

Thus according to a further feature of the invention, there is provided in, or for use in conjunction with, an ejection seat for an aircraft, a three part multi-service connector of the form above described, the body part of the connector being attached or being adapted to be attached to the ejection seat (for example, to the seat pan at one side of the seat) and means being provided automatically to operate the detent means securing together the several parts of the connector thereby to achieve disconnection of such parts at appropriate stages in the ejection of the seat.

Where the ejection seat is provided with leg-restraining means, then mechanism is preferably also provided to ensure that the lock or latch mechanism of such means will be released simultaneously with the release of the said personal part of the multi-service connector from the body of the latter.

Moreover there may also be provided means for automatically releasing the detent means attaching the personal connector part of the multi-service connector to the body of the latter and for also releasing the lock or latch of the leg restraining means (where these are provided) all simultaneously with the release of the seat harness from the ejection seat (with the consequent freeing of the airman) subsequent to the launching of such seat from the aircraft.

For achieving the said automatic release of the detent means of the personal part of the multi-service connector after the launching of the seat, such detent means may be coupled to, and be operated by, the mechanism employed in the ejection seat for automatically releasing the seat harness from the seat at an appropriate stage during the ejection of the latter. Such harness release mechanism may also be utilised for automatically actuating the means for releasing the lock or latch mechanism of the said leg-restraining means, where these latter means are provided.

To enable the airman to release himself from the aircraft seat and the said multi-service connector in the event of failure of the said automatically operating means to function, manually operable over-riding means may also be provided for releasing the detent means normally retaining the said personal part of the connector on the body of the latter and for simultaneously effecting the release of the seat harness locks and also of the lock or latch means of the leg-restraining means, where these latter means are provided.

The detent means whereby the quickly releasable interconnection of the several major parts of the multi-service connector is achieved, may comprise spring-urged latches, and the means for either manually or automatically quickly releasing said detent means for permitting disconnection of said parts of the connector, may comprise lever means which may conveniently include a hand lever. Thus a hand lever may be provided on the personal part of the connector for manual operation by the airman to release the detent or latch of such personal connector part in order to free this from the connector body when, for example, the airman wishes to leave the aircraft in normal conditions; such hand lever may be furnished with a safety device such as a thumb operable catch for preventing the hand lever being accidentally operated.

The said lever means may also include a further detent or latch-releasing lever independent of the said hand lever on the personal connector part and coupled to, and operable by, said automatic harness lock releasing means and said over-riding manual control mechanism, such further lever means serving, when actuated on the automatic release of said seat harness locks or by the said over-riding control mechanism, to release the said detent or latch of the personal part of the multi-service connector to free such part from the connector body and also simultaneously to actuate the mechanism for releasing the lock or latch mechanism of the leg-restraining means where the latter are provided.

The said hand lever will preferably be so arranged that, when it is manually operated to release the said personal connector part, it also releases the said leg-restraining lock or latch through the medium of the said further lever means, the hand lever being operable independently of the said further lever means and not being adapted to release the said seat harness locks.

The detent or latch releasing means of the aircraft part of the connector may be attached to the aircraft by a static line so that on ejection from the aircraft of the seat (which carries the connector body), the detent or latch means of such aircraft connector part will be operated and the latter part automatically released from the body of the connector.

A kicker member may be provided for automatically lifting the said personal connector part away from the body of the multi-service connector as soon as such part is released. Moreover, for purposes more fully described hereinafter, a pawl may be provided which is adapted automatically to engage and retain the detent or latch for the personal connector part in its released position after being moved to that position by the releasing mechanism, i.e. by the said hand lever or by the said automatically operating mechanism or by the said manual over-ride mechanism, said pawl being, however, automatically displaced, to release the said detent or latch, by the personal connector part when this is replaced on the body part of the connector. The said pawl and the said kicker may be combined into one element and urged to the said detent or latch retaining position by spring means.

Valve means may be provided in the body of the connector and be adapted automatically to close on disconnection of the aircraft part of the connector from the said body in order to prevent the escape of fluid therefrom whilst the personal part of the connector is still attached to the connector body, it being particularly desirable at this time to prevent the opening to the atmosphere of the airman's emergency oxygen line to which reference is made more fully hereinatfer.

The said aircraft part of the connector may also be furnished with self-closing valves which automatically interrupt the flow of fluid from the aircraft supply sources when the aircraft part and the connector body are detached from one another. To prevent the free flow of air and oxygen from the aircraft supply services in these circumstances is particularly important if such services serve more than one airman, for it sometimes occurs that a pilot will order his co-pilot or other crew member to leave the aircraft whilst remaining there himself, in which case he will need the aforesaid services.

The said personal part of the connector may also have a valve in one or more of the fluid conveying holes therethrough, such valve or valves being adapted to close automatically to prevent the escape of fluid from the airman's garments, e.g. from his anti-G garments, on disconnection of the personal part of the connector from the body of the latter. Each of the said holes through the said personal connector part may have such an automatically closing valve if desired, so that the ingress of water to the airman's clothing would be prevented should he, after ejection from an aircraft for example, land in water.

The said personal and aircraft parts of the connector may also have electrical connector means readily separable from the said conductor means of the body of the connector when the personal and/or aircraft parts of the connector are detached from the body of the latter.

Any appropriate fluid-tight sealing means may be provided between the several interconnectible parts of the connector to ensure that there is no leak of fluid between these parts when they are interengaged with one another. Similarly, sealing means may also be provided to avoid the ingress of moisture to electrical connections between the said interconnectible parts of the multi-service connector.

A cover plate may be provided for protecting the upper side of the body of the connector when the personal connector part has been removed therefrom. This cover plate may be hinged to the connector body or to a part adjoining the same or may be very similar to the personal part of the connector and be adapted to be attached to the body of, and to seal, the latter in the same way as the personal part, this cover plate not, however, being furnished with means to connect it to the hoses of the airman's clothing or with electrical connections, as is the normal personal connector part.

Provision is preferably also made for connecting an emergency supply of oxygen to the oxygen supplying passage through the body of the connector and means may be furnished for (*a*) manually controlling the supply of such emergency oxygen to the airman and (*b*) for automatically turning on this supply when separation of the connector body from the aircraft part takes place (as during ejection of an ejection seat from an aircraft) and the oxygen supply from the aircraft to the pilot is consequently cut off. The said emergency supply of oxygen is particularly useful for supplying the airman with oxygen during the period of ejection from the aircraft and whilst he is still attached to the ejection seat, the source of oxygen supply in this case conveniently being a bottle of compressed oxygen carried on the seat itself.

If desired, guide flanges or plates may be provided on the front and rear surfaces of the connector body to assist in guiding the personal and/or aircraft parts of the connector into their respective positions as they are being attached to the body of the connector. Such guide plates also serve as guards to prevent garments and other equipment impeding the connection of the said personal and/or aircraft parts of the connector to the body of the latter.

Locating pins and co-operating guide slots may be provided respectively on the detachable personal and aircraft parts of the connector and on the body of the latter for locating the said detachable parts with respect to the connector body as the former parts are being mounted on the latter part.

In order that the invention may be more readily understood, one embodiment of the same, as applied to an ejection seat for an aircraft, will now be described by way of example with reference to the accompanying drawings, in which.

Figure 1:
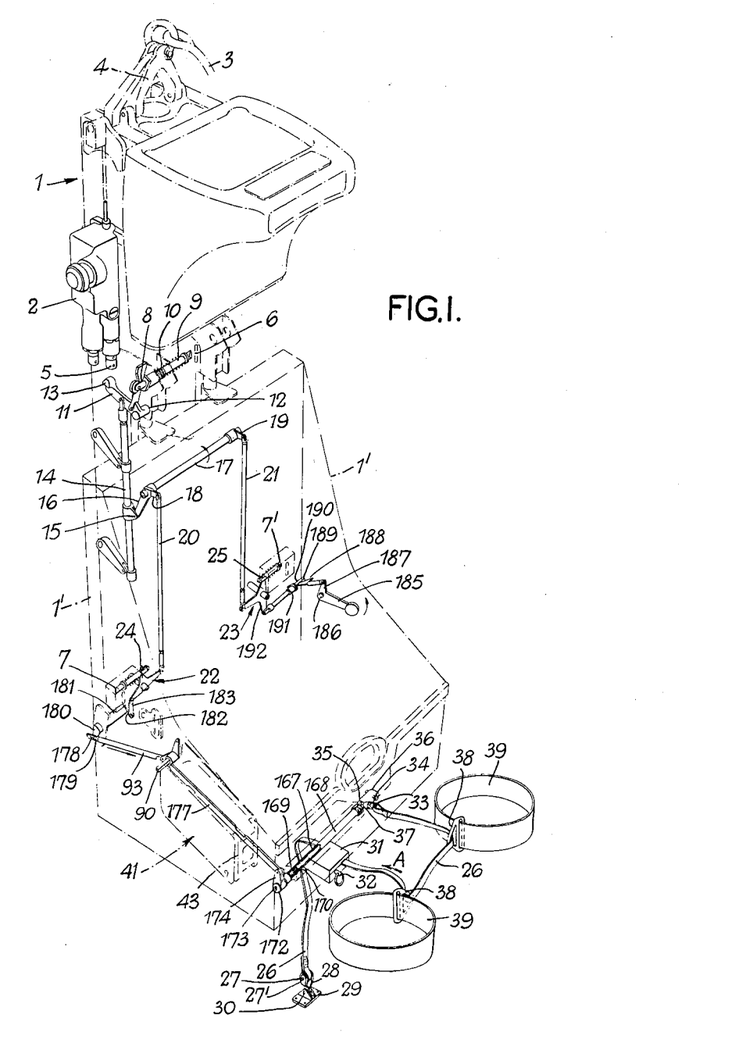
FIGURE 1 is a perspective view showing the application of this invention to an aircraft ejection seat.

Referring to FIGURE 1 of the drawings, 1 is an ejection seat of the aforementioned Martin-Baker type and 1' is the seat pan which is adjustable up and down with reference to the frame of the seat. As this ejection seat is of generally known form no detailed description of the same will be given herein, but in order that the present invention may be fully understood, brief reference will be made to certain parts of the ejection seat, namely the delay mechanism 2 which controls the release of the main drogue parachute cable 3 from the shackle 4 at the top of the ejection seat, the release of this shackle being effected by a spring loaded shackle release plunger 5 which also serves to release the locks 6 and 7, 7' which co-operate with the ring fittings or eyes of the seat harness, the lock 6 being located centrally more or less at shoulder height in the seat and the locks 7, 7' being located one on each side of the seat substantially at seat level.

The lock 6 is released by the operation of a sear 8 on a plunger 9 urged to its locking position by a spring 10, the sear 8 being linked to an intermediate point of a harness lock release lever 11 pivoted at one end at 12 to a side beam of the seat and adapted to be engaged at its other end 13 by the lower end of the spring urged-shackle release plunger 5 when this plunger is released from its "cocked" position at an appropriate moment in the ejection sequence of the ejection seat.

In the arrangement being described (although any other suitable system could be employed) the lever 11 is connected to a link 14 mounted for parallel motion and extending down one said side beam of the seat, the link being pivotally connected at 15 to one end of a lever arm 16 fixed upon a cross shaft 17 extending across the seat between the two side beams thereof and itself furnished with a pair of lever arms 18 and 19 which are respectively connected to the upper ends of a pair of dependent links 20, 21. These links 20, 21 are respectively each connected to one arm of one of a pair of bell crank levers 22 and 23 arranged one near each side of, and pivoted to, the seat pan and each having an arm 24, 25 respectively engaging one of the two seat harness locks 7 and 7' respectively so that when the shaft 17 is rotated by the lever 16 on depression of the link 14, the seat harness locks 7, 7' are released simultaneously with the withdrawal of the sear 8 and the release of the seat harness lock 6.

In applying this invention to such a seat, the latter is preferably furnished with leg-restraining means which normally permit the airman freedom of leg movement during normal flight but which, when the seat is ejected, pull the airman's legs into a position in which they are held firmly against the front of the seat pan. The said leg-restraining means comprise a line 26, conveniently in the form of a length of nylon cord. This line is anchored at its rear end to a bobbin 27 having conical coaxial protuberances 27' engaged in holes in a U-shaped bracket 28 fixed by a further bracket 29 and a quick release pin 30 to the floor of the aircraft cockpit. The line 26 passes upwardly and forwardly through a snubbing box 31 (of known form) fixed to the underside of the seat pan 1' and which permits rearward movement, i.e. movement in the direction of the arrow A, of the line 26 but does not permit movement of the line in the opposite or forward direction except when the line is freed by manual operation by the airman of a release pin 32.

The front end of the line 26 is attached to an eye 33 of a frusto-conical shouldered terminal plug 34 adapted to fit into a frusto-conical socket 35 provided in a latch housing 36 on the front of the seat pan 1' and adapted to be locked therein by a spring-pressed forked latch 37 engaging behind the shoulder of the plug and in an annular groove around the latter, the said plug only being releasable by the withdrawal of the said latch 37 from the plug.

The line 26 is adapted to be passed through D rings 38 on leg bands 39 adapted to be strapped around the legs of the airman below the knees, the arrangement being such that, when the ejection seat is launched from the aircraft, the line 26 is drawn rearwardly through the snubbing box 31 so that the legs of the airman are brought up against the front of the seat pan where they are held until such time as the plug 34 is released from the socket 35 after the seat has been launched. The connection of the bobbin 27 (to which is anchored the rear end of the line 26) to the bracket 28 is such as to part when a predetermined tension has been reached in the line 26 during ejection of the seat so as thereby to free the line from the aircraft without releasing the restraint on the airman's legs. The release of the plug 34 from the latch housing 36 to free the airman's legs is accomplished as hereinafter described.

The body 40 of a multi-service connector (generally indicated by the reference 41) is bolted to one side of the seat pan 1' of the ejection seat 1. This body comprises (as clearly seen from FIGURE 3) a block 43 of oblong prism form having, in the example illustrated, four passages or ducts extending vertically therethrough, these four passages being marked respectively 44, 45, 46 and 47 and being arranged in a single central row along the body 43. The passages 44, 45 and 46 are intended for the flow of fluid through the block whilst the passage 47 is intended to receive an electrically insulating bush 48 carrying electrical conductors subsequently described.

Figure 3:
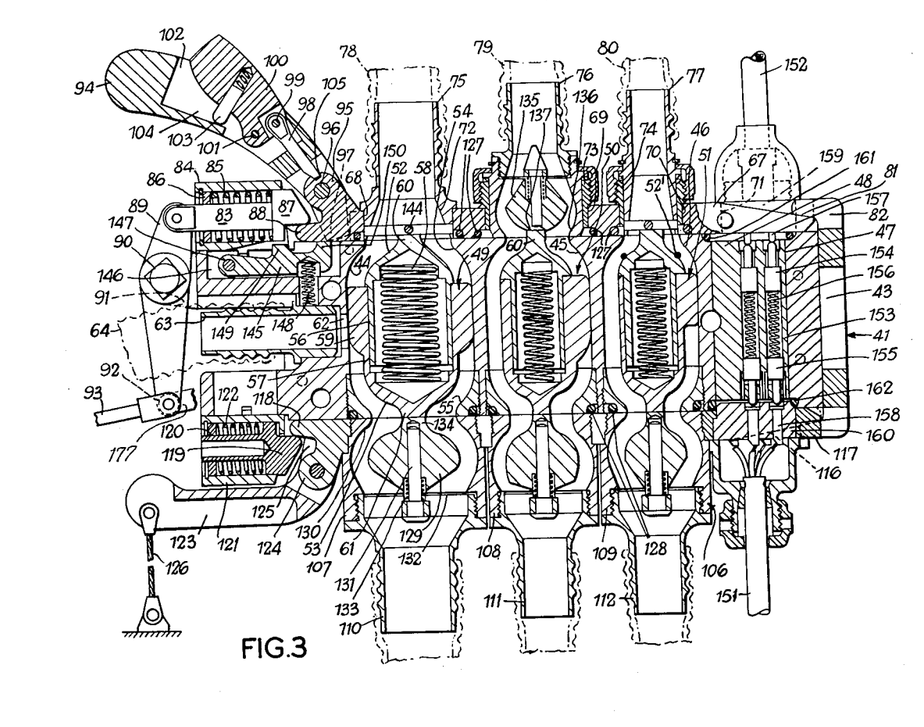
FIGURE 3, is a part side elevation and part longitudinal vertical medial section through the multi-service connector shown in FIGURE 2.
Figure 4:
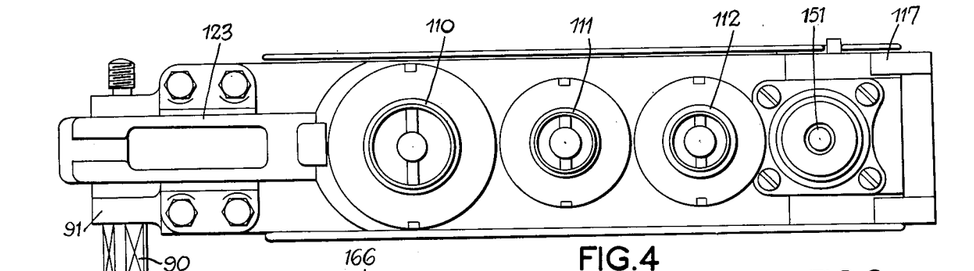
FIGURE 4 is an underneath view of the connector.

Conveniently the passage 44 serves for the conveyance of oxygen to the airman from the main oxygen supply source of the aircraft whilst the passage 45 conveniently serves for the flow of pressurised air to the air ventilated clothing of the airman, this pressurised air being supplied from an appropriate source in the aircraft. The third passage 46 conveniently serves to convey air under pressure from the supply source in the aircraft to the individually pressurised anti-G clothing of the airman. It should be understood, however, that the passages through which the air and oxygen flow may be arranged in a different order to that described above.

In each of the passages 44, 45 and 46 is mounted a valve assembly, these assemblies being respectively marked in the drawings, 49, 50 and 51. All these valve assemblies are similar in form although they differ in diameter to suit the diameters of the passages 44, 45, and 46 whose diameters are determined in accordance with the volume of fluid that has to pass through them. Since the valve assemblies are all similar, the same references will be used for the corresponding parts of all the valve assemblies.

The said valve assemblies each comprise two valves 52 and 53 arranged at opposite ends of the assembly and respectively adapted to co-operate with an inwardly converging matching valve seat provided around the wall of the corresponding passage 44, 45 or 46, there being one of these valve seats at each end (i.e. at the lower inlet and upper outlet ends) of the passage and such seats being marked 54 and 55 respectively in the drawings.

The valves 52 and 53 are respectively formed integrally with hollow cylindrical bodies 56 and 57 which telescope to a limited extent one within the other and which house a helical compression spring 58 always urging the valves 52 and 53 apart in an axial direction and thus tending always to close these valves upon their seats 54 and 55.

The outer hollow valve body 57 is of smaller diameter than the passage in which it is centrally located thereby to permit the free flow of fluid through the passage, and in order to centralise and stabilise said valve body in the said passage such body is furnished at intervals therearound with longitudinally arranged ribs 59 of aerofoil form, these ribs being of the said form in order to provide a minimum drag on the flow of air and/or oxygen, as the case may be, through the passage, it being of importance to avoid any excessive impedance to the flow of fluid through the passages 44, 45 and 46.

The end surfaces of the valves 52 and 53 designed for co-operation with the corresponding valve seats 54 and 55 are of a generally domed or hemispherical character and are furnished centrally with outward axial projections (marked respectively 60 and 61) which serve to co-operate with other parts of the connector body 43 when these are applied to the connector body 43, thereby to open the valves, all as will hereinafter be more fully explained. However, if desired, instead of having a metal-to-metal contact between the valves 52 and 53 and their seats 54 and 55, the valves or the seats may have an annular rubber or other sealing ring of small cross-sectional dimensions bonded therearound, for example, as indicated in dotted lines at 52' FIGURE 3.

In one end of the connector body 43 is formed a bore 62 which is at right angles to, and communicates with, the central portion of the passage 44 in the body 43. This bore is enlarged at its outer part to receive a tubular nipple 63 in a fluid-tight manner, this nipple being for connection to a flexible hose 64 of an emergency oxygen supply assembly including an oxygen bottle 65, secured to the seat 1, and a relief valve 66 of known construction.

For attachment to the upper side of the connector body 43 there is provided an upper block or plate 67 of generally rectangular form in plan and herein referred to as the "personal part" of the connector. This part is furnished with four holes respectively marked 68, 69, 70 and 71 extending therethrough perpendicularly to its upper and lower surfaces and respectively corresponding in size to the upper ends of the passages 44, 45, 46 and 47 through the connector body 43 and being adapted centrally to register with such passages, when the personal connector part 67 is applied to the said body.

In the holes 68, 69 and 70 are respectively mounted tubular bushes 72, 73 and 74 furnished in a fluid-tight manner with tubular nipples 75, 76 and 77 adapted respectively to receive hoses 78, 79 and 80 leading to the airman's clothing.

The personal part 67 of the connector is adapted for releasable fluid-tight connection to the connector body 43 and for this purpose the personal connector part has each of its front corners longitudinally chamfered at 81 so as to be adapted to fit at these corners in wedging fashion below overhanging lugs 82 provided at the corresponding upper front corners of the connector body 43, whilst at its rear end the personal part 67 of the connector is adapted to be clamped to the connector body 43 by detent means provided on the latter part.

The said detent means comprise a longitudinally slidable plunger 83 mounted in a housing 84 provided on the upper rear part of the connector body 43, the plunger being urged in a forward direction by a compression spring 85, this spring being located in the housing 84 around the plunger 85 and between a spring retaining ring 86 in the housing 84 and a latch-shaped head or detent 87 provided on the front end of plunger 83 for co-operation with a rearwardly directed chamfered wedge-like portion 88 provided centrally at the rear end of the personal connector part 67, interengagement of said latch head with the portion 88 serving to lock the connector part 67 to the connector body 43 in a quickly detachable manner.

The rear end of the plunger 83 is pivotally connected to the upper end of a lever 89 fixed upon a cross shaft 90 mounted in lugs 91 provided on the connector body 43 at the rear end thereof. Also fixed upon the shaft 90, at the seat end thereof, is a dependent lever 92 connected to the front end of a rearwardly extending link 93 to which further reference will be made hereinafter.

By pushing the link 93 forwards the plunger 83 can be withdrawn rearwardly against the action of the spring 85 so as to disengage the latch head 87 from the central portion 88 of the personal connector part 67 of the connector, thereby to release the part 67 from the body 43. Operation of the plunger 83 by the link 93 is only effected, as hereinafter described, when it is desired that the personal connector part 67 should be automatically released (as in an emergency) or manually released (e.g. in said emergency) by an over-ride control should the automatic means fail to operate.

For releasing the personal connector part 67 in normal circumstances, there is provided a hand lever 94 having a bifurcated lower end portion straddling an upstanding central lug 95 carried upon the rear upper portion of the personal connector part 67 and furnished with a transverse pivot pin 96 passing through the bifurcated end of the lever 94. This lever normally occupies a rearwardly directed position and has on its lower bifurcated end portion a pair of toe parts 97 which, when the lever 94 is pulled forwardly by the airman, serves to push the latch head 87 rearwardly and to disengage it from the chamfered central portion 88 of the personal connector part 67, thereby to release the latter from the connector body 43.

In order to avoid accidental forward movement of the lever 94, the lever is furnished with a thumb-operated catch device comprising a plunger 98 pivotally connected at 99 to the lower portion of a thumb pressed lever 100 pivoted at 101 to the lever 94 within a longitudinal recess 102 in which the finger lever 100 is mounted. The thumb lever 100 is urged forwardly by a spring-pressed pin 103 abutting at its rear end against the base 104 of the said recess 102 in the lever 94 and the arrangement is such that the plunger 98 is normally retained in engagement with a notch 105 furnished in the upstanding lug 95 on the personal connector part 67, thereby to lock the lever 94 against rotation about its pivot 96. To release the lever 94 for forward movement in order to disengage the latch head 87 from the personal connector part 67, the thumb lever 100 has first to be pressed rearwardly, thereby to withdraw the plunger 98 from the notch 105 in the lug 95.

The multi-service connector also includes a further part 106, hereinafter referred to as "the aircraft part," adapted to be attached to the underside of the connector body 43 in a similar manner to that in which the personal connector part 67 is attached to such body, the said aircraft connector part having therethrough three passages in which are respectively secured tubular bushes 107, 108 and 109 which correspond in size and position with the passages 44, 45 and 46 through the connector body 43. Into the lower ends of the tubular bushes 107, 108 and 109 are screwed the upper ends of tubular nipples 110, 111 and 112 respectively which are intended for connection to hoses 113, 114 and 115 leading respectively to the supply sources of the aircraft which provide the necessary pressurised air and oxygen for inflating and ventilating the airman's clothing and for inflating the airman's anti-G garments.

The said aircraft part 106 of the connector is furnished at its front lower corners with chamfered portions 116 to engage under overhanging lugs 117 provided on the connector body 43 and similar to the lugs 82 previously described. Similarly the aircraft connector part 106 is, like the personal connector part 67, furnished with a central chamfered portion 118 for co-operation with a latch head or detent 119 on a plunger 120 mounted in a housing 121 carried by the rear lower part of the connector body 43, and the said plunger being urged forwardly by a compression spring 122.

The aircraft connector part 106 also has a latch release lever 123 pivoted on a dependent lug 124 on the rear lower central portion of the aircraft connector part 106, this lever being furnished, like the lever 94 previously described, with toe parts 125 adapted, when the lever 123 is pulled downwardly, to push the latch head 119 rearwardly, thereby to release the aircraft part 106 of the connector from the body 43 of the latter.

The lever 123 is adapted to be connected by a flexible static line 126 (or a telescopic rod) to the floor of the aircraft cockpit so that when the ejection seat leaves the latter, carrying with it the connector body 43, the lever is pulled downwardly and the latch head 119 is disengaged from the aircraft connector part 106 to free the latter from the connector body 43. No over-ride control means and no automatically operable means corresponding to the lever 92 and link 93, previously described, are provided for actuating the latch head 119 to release the aircraft connector part 106: the latter may, however, be released manually by pushing the lever 123 downwardly and forwardly.

In order to make fluid-tight seals between the three connector parts 43, 67 and 106, resilient sealing or O-rings 127 are provided. These are arranged, in the personal connector part 67, in annular recesses on the underside of such connector part and around the lower ends of the holes 68, 69 and 70 therein, these sealing rings being adapted to engage the upper surface of the connector body 43 when the connector part 67 is applied thereto. Similar sealing rings 128 are located in annular recesses provided in the body part of the connector around the lower ends of the passages 44, 45 and 46 therein and are trapped between the body 43 and the aircraft connector part when this is applied to said body.

It will be seen that when the personal connector part 67 of the multi-service connector is removed from the connector body 43, the valves 52 of the three valve assemblies 49, 50 and 51 will spring upwardly to engage the co-operating valve seats 54 at the upper ends of the passages 44, 45 and 46 in the body of the connector and thereby automatically cut off the flow of fluid from the aircraft supply sources and from the oxygen emergency bottle 65, should this be in operation.

It will also be noted that when the connector body 43 is detached from the aircraft part 106 of the connector, the valves 53 of the valve assemblies 49, 50 and 51 also automatically close on to their seats 55. Thus, assuming the personal connector part 67 to be still attached to the body 43, the closing of the valves 53 prevents the escape of pressure fluid from the airman's garments and also the escape to the atmosphere of oxygen from his emergency supply, assuming this to be turned on.

Where the fluid pressure and oxygen supply sources of the aircraft are to serve more than one airman in the same aircraft, it is particularly desirable to ensure that, when any such airman is ejected from the aircraft, the fluid pressure and oxygen supplies to the other airman or airmen remaining in the aircraft shall not fail due to the dissipation of fluid pressure and oxygen from the supply lines leading to the aircraft part of the multi-service connector of the airman abandoning the aircraft. Thus, each of the tubular bushes 107, 108 and 109 of the aircraft connector part 106 is furnished with a valve 129 adapted to co-operate with an internal annular valve seat 130 around the upper end of the tubular bush, each valve 129 being mounted for sliding movement on a central guide pin 131 carried on an apertured spider 132 within the corresponding tubular bush and urged by a compression spring 133 in an upwards direction towards the corresponding annular valve seat 130. Thus as soon as the aircraft connector part 106 is disconnected from the body part 43, the valves 129 spring to a closed position and cut off the discharge of fluid from the tubular bushes 107, 108 and 109.

Each of the valves 129 is furnished at its upper end with an upstanding central projection 134 which engages, when the aircraft connector part 106 is attached to the connector body 43, with the similar projection 61 of the corresponding valve 53 so that both valves are moved axially in opposite directions and respectively away from their valve seats 130 and 55 so as to permit free flow of fluid into the connector body 43.

It may similarly be desirable to provide self-closing valves in one or more of the tubular bushes 82, 73 and 74 of the personal connector part 67 but only one such valve is shown in the drawings, this valve being provided in the central bush 73 and being marked in the drawing 135; this valve is similar to the valves 129 above described and co-operates with an internal valve seat 136 around the lower end of the bush 83. A projection 137 is provided on the valve 135 for co-operation with the similar projection 60 on the co-operating corresponding valve 52 in the connector body part 43: thus, when the personal connector part 67 is applied to the connector body 43, the valves 135 and 52 co-operate to move each other from their respective valve seats 136 and 53, whereas when the personal connector part 67 is removed from the body 43, both valves automatically close.

Valves similar to the valve 135 may be provided in the other two bushes 72 and 74 in order to seal the hoses leading to the airman's clothing when the perconal connector part is detached from the connector body 43 and thus to avoid the liability of the water entering the interior of the airman's clothing should he become immersed in water on leaving the aircraft, e.g. by parachuting into the sea.

If valves such as the valve 135 are not provided in one or more of the tubular bushes 82, 73 and 74, then a cross bar 144 is provided across the lower end of each such valveless tubular bush to act on the spigot 60 of the corresponding valve 52 in the body 43 thereby to open such valve when the personal connector part 67 is mounted on the connector body 43.

If desired, guide plates 138 and 139 may be provided respectively on the inner and outer sides of the connector body 43, these plates projecting above and below the lower edges of such body part and forming centralising guides to assist in locating the personal and aircraft connector parts 67 and 106 respectively with reference to the connector body 43 when they are being attached to the latter. If desired, the upper parts of the plates 138 and 139 may diverge slightly from one another. Moreover, at least the guide plates 138 and 139 may be furnished respectively in their upper and lower edges, towards the front ends thereof, with notches 140 and 141 to receive and register locating studs 142 and 143 furnished on the personal and aircraft connector parts 67 and 106 respectively, these notches and pins serving to locate the said connector parts 67 and 106 in a longitudinal direction with respect to the connector body 43 when these parts are being attached to one another and to reduce the liability of damage being done to the valves of the connector if the personal and aircraft parts thereof are carelessly applied to the connector body 43.

The guide plate 139 may be extended, as shown, upwardly above the connector body 43 to safeguard against the attachment of the personal connector part 67 to the connector body 43 being impeded by garments or other equipment.

Figures 2, 5:
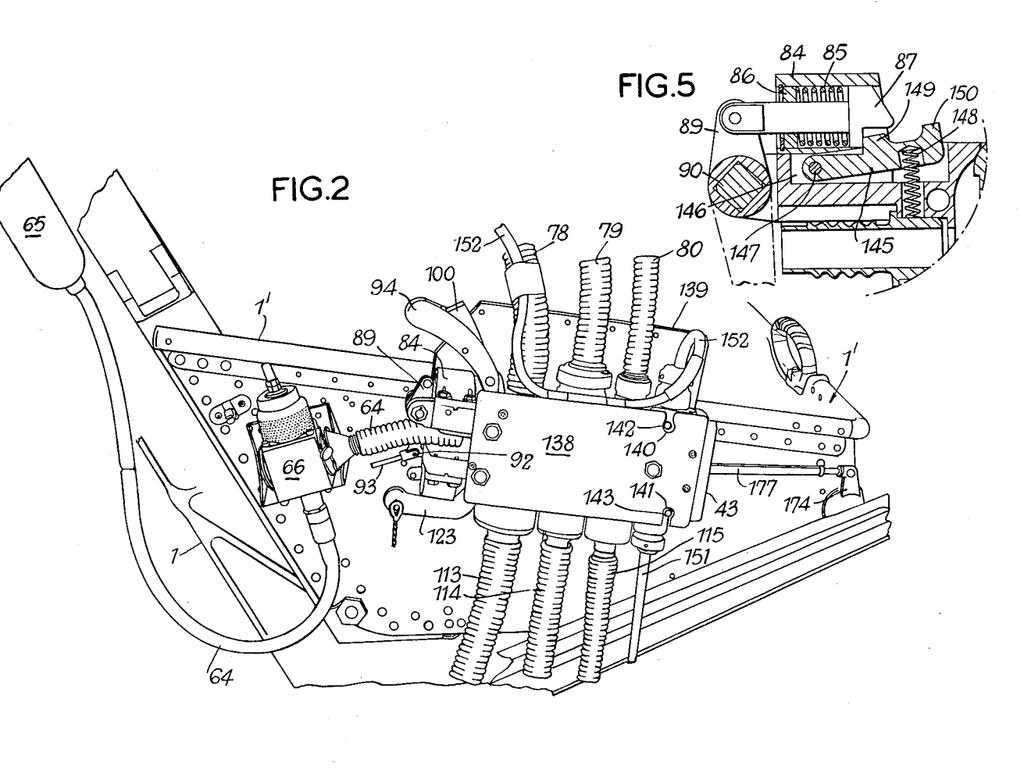
FIGURE 2 is a diagrammatical perspective view of the seat pan with the multi-service connector applied thereto.
FIGURE 5 is a detail of the latch-retaining pawl and kicker of the personal connector part of the connector, shown with the latter part removed from the connector body.

In order automatically to hold the latch head 87, which co-operates with the personal connector part 67, in its withdrawn position after being moved to that position to release the said connector part, a latch-retaining pawl 145 (see FIGURE 5) is provided, this pawl being located in a recess 146 in the upper rear end portion of the connector body 43 and being mounted on a pivot pin 147 so that it may be urged upwardly by a compression spring 148 acting between the pawl and the said body 43. The pawl 145 is provided with a nose 149 for engaging with the withdrawn latch head 87 and is also provided with an extension 150 acting as a kicker for engaging the underside of the personal connector part 67 so as to eject this part from the body 43 when the connector part 67 is released by the latch head 87, thus facilitating the separation of the airman from the ejector seat. The engagement of the pawl 145 with the withdrawn latch head 87 serves, through the connection of the latch head with the leg restraining latch means as hereinafter described, to maintain such latch means released so long as the personal connector part is disconnected from the connector body. Thus the airman cannot couple up his leg restraining means until he has first replaced the said personal connector part on the connector body. When the personal connector part 67 has been removed from the body 43, the said kicker protrudes above the upper surface of the body 43 and with the kicker in this condition the pawl 145 holds the latch head 87 in its withdrawn position; however, when the personal connector part 67 is replaced on the body 43 and pressed downwardly on to the latter, it depresses the kicker 150 and withdraws the pawl nose 149 from the latch head 87.

For making the electrical connections between the three parts of the multi-service connector and thus between a supply cable 151 leading from the aircraft electrical supply source and an airman's cable 152, an appropriate number of electrical conductors are arranged in the insulating bush 48 (FIGURE 3) in the passage 47 of the connector body 43. There will be as many of these conductors in the bush as there are cores in the cables 151 and 152 and this will usually be in the order of six. Each electrical conductor comprises a metal tube 153 secured in the bush 48 and having in each of the opposite ends thereof an axially slidable contact pin marked 154 and 155 respectively formed of beryllium copper or other suitable metal. These pins are forced axially apart by a compression spring 156 but their endwise outward movement is limited by shoulders in the bush 48 so that at no time do the contact pins 154 project beyond the upper end of the bush 48 and they are therefore not liable to be short-circuited by any metallic part touching the ends of such bush.

For co-operation with the contact pins 154 and 155, the personal and aircraft connector parts 67 and 106 are respectively provided with fixed contact pins 157 and 158 mounted in insulating bushes 159 and 160 secured in these connector parts so as to register with the bush 48, the contacts 158 being recessed, at the ends which meet the pins 155, into their insulating bush 160 so as to avoid the short-circuiting of the contacts 158 by any metallic member falling upon this bush.

The insulating bushes 159 and 160 are adapted to project from their connector parts 67 and 106 and into the passage 47 on the body 43 of the connector when these three parts are secured together, and sealing rings 161 and 162, or any other suitable sealing means, are provided at the upper and lower ends of the passage 47 to ensure the exclusion of moisture to the electrical connections when the personal and aircraft connector parts are attached to the body 43.

Preferably the corresponding pairs of the groups of contacts 157 and 158 and the groups of contact pins 154 and 155 will be disposed in their insulating bushes, in diametrical planes which are oblique to the longitudinal sides or edges of the connector parts so as to reduce to a minimum the possibility of the contacts being short-circuited during the attachment of the personal connector and aircraft parts 67 and 106 to the connector body 43.

By incorporating in the multi-service connector means for making electrical connections between the airman's electrical equipment and the co-operating apparatus or supply source of the aircraft, an additional advantage is gained in that a reliable system is provided whereby an airman can test whether the connections through his multi-service connector, such as the connections for his oxygen and pressurised air supplies, have been properly made because, if his electrical equipment, such as his radio or intercommunication system, is not operating, this will be a clear indication that his personal connector part 67 or the aircraft connector part 106 may not have been applied, or correctly applied, to the connector body 43: if on the other hand satisfactory signals are being received on the intercommunication system, then he will know that the said other services through the connector have been properly connected.

Figures 6, 7:
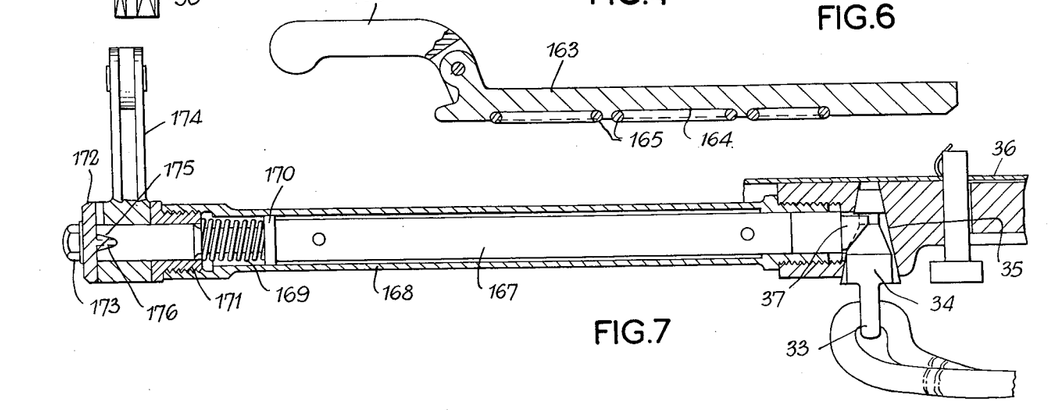
FIGURE 6 is a longitudinal sectional elevation of a cover plate to be used on the connector body when the personal connector part is disconnected therefrom.
FIGURE 7 is a part-sectional elevation showing the leg restraint latch and release mechanism.
Figure 8:
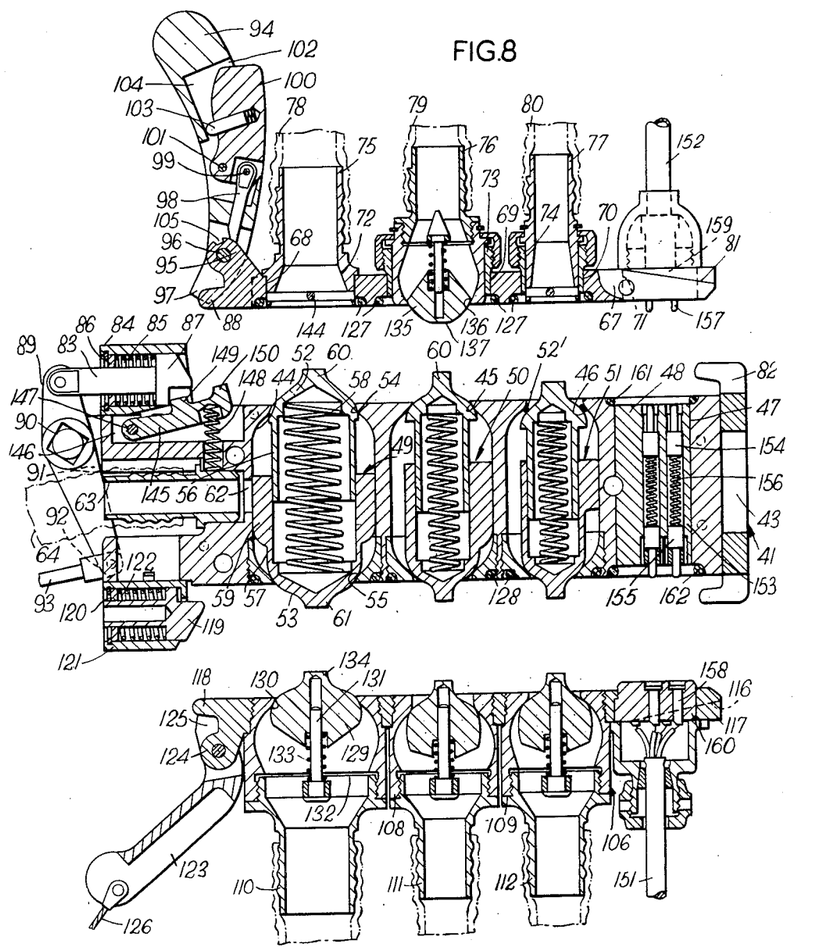
FIGURE 8 is a part side elevation and part longitudinal vertical medial section through the multi-service connector showing the three parts of the connector detached from each other.

Preferably a blank cover plate 163 is furnished to close and protect the top of the connector body 43 when the personal connector part 67 has been removed therefrom. This cover plate is substantially a duplicate of the personal connector part 67 without the holes therethrough or tubular bushes for connecting hoses thereto and without means for making electrical connections to the airman's cable 152. However, the cover plate is furnished on its under side with a recess 164 for each of the passages 44, 45 and 46 through the connector body 43, these recesses containing sealing rings 165 and serving to receive the projections 60 on the upper parts of the closed valves 52 of the valve assemblies 49, 50 and 51.

For the stowage of the cover plate 163 when this is detached from the connector body 43, a tray or slipper (not shown and which may be mounted in a convenient position upon the ejector seat or within the aircraft cockpit) is provided, this tray or slipper being fitted with a spring-loaded latch, such as the latch 87 of the connector body 43, and with overhanging lugs, such as the lugs 82 of the said body, so as detachably to receive the cover plate 163 which is releasable from the tray or slipper by operating a hand lever 166 provided on the cover plate and similar to the hand lever 94 of the personal connector part 67 but not having the thumb-operated catch lever 100 and parts connected therewith and being of a rather different shape to the hand lever 94.

The latch 37 for locking the plug 34 of the leg restraining line 26 in the latch housing 36 on the front of the seat pan 1' has already been described. It is now necessary to explain how the latch 37 is operated to release the plug, first from the manually operable handle 94 of the personal connector part 67, alternatively automatically from the seat harness lock release mechanism and thirdly from a manual over-riding control.

The latch 37 is carried at the inner end of a horizontally arranged rod 167 (see FIGURES 1 and 7) mounted in a tubular housing 168 fixed to the front of the seat pan 1' of the ejection seat and carrying the latch and socket housing 36, the rod 167 being axially slidable in the housing 168 and urged to its latching position by a compression spring 169 arranged in the said housing and around the rod 167 between a fixed collar 170 on the rod and a bush 171 in the outer end of the housing 168.

The latch rod 167 is continued outwardly beyond the bush 171 and is furnished with a cam riser disc 172 secured on its outer end by a stud 173, the said disc being keyed against rotation relatively to the latch rod 167. Upon the latch rod 167 and between the cam riser disc 172 and the outer end of the bush 171, is mounted for rotation one end of a crank arm 174 having a boss which is furnished, on the end thereof adjoining the cam riser 172, with a pair of diametrically opposite cam recesses 175 co-operating with corresponding cam projections 176 on the cam riser disc 172 so that, when the crank arm 174 is turned upon the latch rod 167 the latter is axially withdrawn to disengage the latch 37 from the shoulder of the plug 34 thereby to free the latter from the housing 36.

The crank arm 174 is connected pivotally to the front end of a link 177 (see FIGURE 1) passing rearwardly along the multi-service connector-side of the seat pan between the body 43 of such connector and the seat pan. The rear end of the link 177 is pivotally connected to the lever 92 (to which the front end of the link 93, hereinbefore described, is also connected) depending from the shaft 90 carrying the lever 89 which serves to actuate, or to be actuated by, the latch plunger 83. Thus, whenever the hand lever 94 of the personal connector part 67 is pulled forwardly to release the said personal connector part from the connector body 43, the link 177 will simultaneously be moved endwise and cause such rotation of the lever 174 on the latch rod 167 as to produce the axial withdrawal of the latter and the release of the frustoconical plug 34 at the front end of the leg-restraining line 26, whilst the return of the latch head 83 to its locking position will effect the return of the latch rod 167 and the latch 37 to their leg-restraining line locking positions.

Release of the personal connector part 67 from the connector body 43 by the automatic withdrawal of the latch head 87 is achieved through the medium of the link 93, the rear end of which has a longitudinal slot 178 in which is located a pin 179 fixed to the lower end of a lever or crank arm 180, itself fixed upon the outer end of a horizontal shaft 181 suitably journallised in the seat pan 1' and having fixed on the inner end thereof a lever or crank arm 182 of which the outer end is connected by a link 183 to an arm 184 of the bell crank lever 22, previously described, for withdrawing the bolt of the harness lock 7. Thus, when this lock bolt is automatically actuated by the link 20 and bell crank lever 22 to release the lock 7, the link 93 is pushed forwardly with the consequential withdrawal of the latch head 87 from the personal connector part 67 and the simultaneous movement of the link 177 in a forward directon to release the plug 34 of the leg-restraining line 26. All these operations are automatically achieved by the action of the shackle release plunger 5 upon the seat harness release lever 11 at the appropriate stage in the ejection of the seat from the aircraft.

The lost motion afforded by the provision of the slot 178 in the rear end of the link 93 enables the personal connector part 67 to be released from the connector body 43 and the plug 34 of the leg restraining line 54 also to be freed from its socket by the operation of the hand lever 94 without the simultaneous release of the harness locks 6, 7 and 7'.

The over-riding manual release of the harness locks 6, 7, 7', the personal connector part and the plug 34 of the leg-restraining line 26, is simultaneously effected by means of a manually operable control lever 185 pivoted at 186 to the side of the seat pan 1' remote from the multi-service connector, such hand lever having an arm 187 connected to a sear 188 engaged against a roller 189 carried in the bifurcated end of a horizontal rod 190 slidably mounted in journals 191 carried by the seat pan. The rod 190 is connected at its inner end to an arm 192 provided on the bell crank lever 23 operating the seat harness lock 7' and is also connected to the link 21: thus, when the over-riding control lever 185 is pulled in the direction of the arrow in FIGURE 1, the sear 188 is urged rearwardly so as to withdraw the rod 190 and cause a simultaneous release of the latches of the said harness locks 7', 7 and 6 through the medium of the interconnected links 21, 20 and cross shaft 17. The same operation of the manual overriding control lever 185 causes, through bell crank lever 22, the operation of the links 93 and 177 to bring about the release of the personal connector part 67 from the connector body 43 and the freeing of the plug 34 of the leg-restraining line 26.

I claim:

1. A connector for an aircraft having an airman's ejection seat means for holding the airman in the seat, means for automatically releasing such holding means to release the airman from his seat after ejection, and at least two sources for the supply of fluid to the airman, said connector being adapted for connecting such sources to supply lines carried by the airman, the connector comprising a personal part which is the terminal piece for the airman's supply lines; a body part for attachment to said ejection seat and formed with at least two passages for conveying said fluid therethrough and for passing such fluid to said personal part and thereby to the airman's supply lines; an aircraft part for attachment to said body part and serving to connect the latter to said supply sources; first and second detent means for fluid-tightly connecting together the said body and aircraft parts, and said personal and body parts of the connector respectively so as to place the airman's supply lines in communication with said supply sources; a valve in at least one of the passages in said body part adapted to close such passage upon disconnection of the body part from the aircraft part of the connector; first release means associated with said first detent means and arranged to cooperate with a fixed part of the aircraft so as automatically to release said first detent means, and thereby to disconnect said body and aircraft parts of the connector upon ejection of said seat; and second release means associated both with said second detent means and with said means for releasing the airman from said seat, so as automatically to release said second detent means, and thereby to disconnect said personal and body parts of the connector, simultaneously with the release of the airman from his seat after ejection 2. A connector for an aircraft having an airman's ejection seat, airman's seat harness, locks on said seat for securing said harness, means automatically operable to release said locks after the launching of the seat from the aircraft, and at least two sources for the supply of fluid to the airman, said connector arrangement being adapted for connecting such sources to supply lines carried by the airman, the arrangement comprising a connector having: a personal part which is the terminal piece for the airman's supply lines, a body part for attachment to said seat and formed with passage means for conveying said fluid therethrough and for passing such fluid to said personal part and thereby to the airman's supply lines, and an aircraft part for attachment to said body part and serving to connect said passage means to said supply sources; said arrangement further comprising first and second detent means for fluid-tightly connecting together the said body and aircraft parts, and said body and personal parts of the connector respectively so as to place the airman's supply lines in communication with said supply sources; a valve in said passage means in said body part adapted to close said passage means upon disconnection of the body part from the aircraft part of the connector; means coupling said second detent means which interconnect the personal and body parts of the connector with said harness lock release means, whereby such personal part is released from such body part simultaneously with the release of the seat harness from the seat; a line for restraining the legs of an airman in said seat during ejection of the latter; latch means for maintaining said line in leg restraining condition; latch releasing means actuated by said second detent means for releasing said latch means when said detent means releases said personal connector part from the body part of said connector; and manually operable over-riding control means coupled to said seat harness locks, said second detent means, and the latch means of said leg restraining line for simultaneously releasing said locks, second detent means, and latch means.

3. An arrangement as claimed in claim 2, wherein said second detent means is coupled by a link and lost motion device to the release means of the seat harness locks for actuation by the said automatically operating harness lock release means and by said over-riding manual control means.

4. A connector as claimed in claim 1, further including a spring biassed pawl adapted automatically to engage and retain said second detent means in the released position thereof, said second detent means being moved to said released position by said second releasing means, and means for automatically displacing said pawl out of engagement with said second detent means when said second detent means is moved into position to connect said personal part and said body part of the connector.

5. A connector as claimed in claim 4 and including, in combination with the said pawl, a kicker member for automatically lifting the said personal connector part away from the body part of the connector when said personal connector part is released from said body part.

6. A connector arrangement for an aircraft having a plurality of sources for the supply of fluid to an airman, an airman's ejection seat, means for holding the airman in such seat, and means for automatically releasing such holding means to release the airman from his seat after ejection, said connector arrangement being adapted for coupling said fluid supply sources to respective supply lines carried by the airman, the arrangement comprising a connector having a personal part which is the terminal piece for the airman's supply lines; a body part for attachment to the ejection seat and formed with passage means for conveying fluid therethrough and for passing such fluid to said personal part and thereby to the airman's supply lines; and an aircraft part for attachment to said body part and serving to connect said passage means to said fluid supply sources; said arrangement further comprising first and second detent means for fluid tightly connecting together the said body and aircraft parts, and said personal and body parts of the connector respectively so as to place the airman's supply lines in fluid tight communication with said supply sources; first release means associated with said first detent means and arranged to co-operate with a fixed part of the aircraft so as automatically to release said first detent means, and thereby to disconnect said body and aircraft parts of the connector, upon ejection of said seat; and second release means associated both with said second detent means and with said means for releasing the airman from said seat, said second release means being responsive to ejection of the seat from the aircraft to release said second detent means, and thereby to disconnect said personal and body parts of the connector, simultaneously with the release of the airman from his seat after ejection.

7. A connector arrangement according to claim 6, including manually operable over-riding control means coupled to said second detent means and to said holding means for simultaneously releasing said second detent means and said holding means.

8. A connector arrangement according to claim 7, including lost motion means in said second release means for permitting manual disconnection of said personal and body parts of the connector without release of the airman from his seat.

9. A connector arrangement according to claim 6, said passage means including a plurality of passages having each an inlet and an outlet opening and being respectively coordinated with said plurality of said sources for connection therewith, said arrangement further comprising a two-part telescopic valve in at least one of said passages; spring means in engagement with the two parts of the valve for urging the same apart into respective positions in which they close the inlet and the outlet opening of said one passage, and means operatively connected to each of said detent means for holding a respective one of said valve parts in a passage opening position when said body part is connected by said detent means to the respective one of said aircraft and personal parts, and for permitting closing of at least one of said openings by said valve parts under the urging of said spring means upon disconnection of said body part from one of said personal and aircraft parts.

10. A connector arrangement according to claim 9, at least one of said aircraft and said personal parts being formed with a plurality of conduits therein respectively communicating with said passages when said one part is connected to said body part, said arrangement further comprising a valve in at least one of said conduits; spring means biasing said last-mentioned valve toward a conduit-closing position; and means on said body part for holding the valve in said conduit in conduit-opening position when said one part and said body part are connected, whereby said conduit is automatically closed when the latter parts are disconnected.

11. A connector arrangement according to claim 10, said means for holding the valve in said conduit in conduit opening position including cooperating abutment means on said last mentioned valve and on one of said parts of the telescopic valve in the passage communicating with said conduit when said one part and said body part are connected, said abutment means when in mutual engagement jointly keeping said valve part in the passage opening position and said last mentioned valve in conduit opening position.

12. A connector arrangement according to claim 6, wherein at least one of said detent means includes a latch slidably mounted on one of the two connector parts adapted to be fluid-tightly connected by said one detent means; spring means urging said latch to move in a direction from a released toward a locking position; a lug on the other one of said two connector parts, said lug being adapted to engage and retain said latch locking position thereof; and actuating means for withdrawing said latch from retaining engagement with said lug.

13. A connector arrangement according to claim 12, wherein said actuating means include a hand lever formed with nose means for engaging said latch, and a thumb-operated catch on said lever for preventing unintentional operation of the latter.

14. A connector arrangement according to claim 12, wherein said one detent means further includes a pawl on said one connector part movable toward and away from a position thereof in which said pawl is adapted to retainingly engage said latch when the latter is in the released position thereof; and spring means for urging said pawl to move toward said position thereof.

15. A connector arrangement according to claim 12, further comprising a line for restraining the legs of an airman in said seat during ejection; a latch on said seat for maintaining said line in leg-restraining condition; line latch releasing means for releasing said line from said restraining condition; and linkage means interposed between said line latch releasing means and said slidably mounted latch on said one connector part for simultaneous actuation of said line latch releasing means when said slidably mounted latch is withdrawn from engagement with said lug by said actuating means, said one connector part being said personal part.

16. A connector for an aircraft having an airman's ejection seat and a plurality of sources for the supply of fluid to an airman in said seat, the connector being adapted to couple said sources to supply lines carried by said airman, the connector comprising a body part for attachment to the ejection seat and being formed with a plurality of passages for conveying said fluid therethrough from said sources to said supply lines; means for releasably securing said body part of said connector to said supply lines and to said sources for fluid-tight communication thereof with said passages; a two-part telescopic valve in at least one of said passages; spring means in engagement with the two parts of said valve for urging the same apart into respective closing positions in which they respectively close the inlet and the outlet opening of said passage; holding means operatively connected to said securing means for holding one of said valve part out of said closing position when said body part is secured by said securing means, and for permitting said valve part to be moved into the closing position thereof under the urging of said spring means when said securing means is released.

17. A connector for an aircraft having an airman's ejection seat, means for holding the airman in the seat, means for automatically releasing such holding means to release the airman from his seat after ejection, and at least two sources for the supply of fluid to the airman, said connector being adapted for connecting said sources to supply lines carried by the airman, the connector comprising a personal part which is the terminal piece for the airman's supply lines; a body part for attachment to said ejection seat and formed with at least two passages for conveying said fluid therethrough and for passing such fluid to said personal part and thereby to the airman's supply lines; an aircraft part for attachment to said body part and serving to connect the latter to said supply sources; first and second detent means for fluid-tightly and releasably connecting together the said body and aircraft parts, and said personal and body parts respectively, so as to place the airman's supply lines in communication with said supply sources; a valve in at least one of the passages in said body part adapted to close such passage upon disconnection of the body part from the aircraft part of the connector; a static element for connecting said first detent means to the aircraft so that, on ejection from the aircraft of the ejection seat, said first detent means will be released automatically to free the said aircraft part from the body part of the connector.

18. A connector arrangement for an aircraft having an airman's ejection seat and a plurality of sources for the supply of fluid to an airman, said arrangement comprising a connector for coupling said supply sources to respective supply lines carried by said airman, said connector including a body part formed with a plurality of passages for conveying fluid therethrough, said passages each having an inlet and an outlet opening for respective communication with a source and a supply line; means for attaching said body part to said seat; securing means for securing said body part to said supply lines and to said sources respectively so as to establish communication through said passages between a respective source and supply lines; a two-part telescopic valve in at least one of said passages; spring means urging the two parts of said valve apart into positions in which they respectively close said inlet and outlet openings of said one passage; and means operatively connected to said securing means for holding said valve parts in a passage opening position against the urging of said spring means when said body part is secured by said securing means to a corresponding source and supply line.

References Cited in the file of this patent
UNITED STATES PATENTS

| | | |
|---|---|---|
| 2,494,207 | Sabbia | Jan. 10, 1950 |
| 2,666,656 | Bruning | Jan. 19, 1954 |
| 2,709,557 | Replogle et al. | May 31, 1955 |
| 2,813,690 | Holmes | Nov. 19, 1957 |
| 2,836,382 | Martin | May 27, 1958 |
| 2,859,422 | Oliveau | Nov. 4, 1958 |
| 2,892,602 | Servanty | June 30, 1959 |

FOREIGN PATENTS

| | | |
|---|---|---|
| 543,587 | Canada | July 16, 1957 |